United States Patent [19]
Eckert et al.

[11] 3,884,895
[45] May 20, 1975

[54] BONDING EPDM RUBBER TO GENERAL PURPOSE BUTADIENE POLYMER RUBBER

[75] Inventors: Charles F. Eckert, Wayne; Norman J. Pinkowski, Bloomfield, both of N.J.

[73] Assignee: Uniroyal, Inc., New York, N.Y.

[22] Filed: Apr. 27, 1970

[21] Appl. No.: 32,425

[52] U.S. Cl.... 260/94.2 R; 260/33.6 A; 260/79.5 B; 260/785; 161/253; 156/308; 156/334
[51] Int. Cl. ..... C08d 3/08; C08d 13/20; C08d 9/00
[58] Field of Search .... 260/33.6 A, 94.2 M, 94.2 T, 260/94.2, 79.5 B, 785

[56] References Cited
UNITED STATES PATENTS

| | | | |
|---|---|---|---|
| 2,649,425 | 7/1953 | Hulse | 260/33.6 X |
| 2,739,954 | 3/1956 | Fryling | 260/33.6 |
| 2,841,574 | 7/1958 | Foster | 260/94.2 |
| 3,084,148 | 4/1963 | Youngman et al. | 260/79.5 B X |
| 3,301,840 | 1/1967 | Zelinski | 260/94.2 |
| 3,492,370 | 1/1970 | Wirth | 260/79.5 B X |

*Primary Examiner*—William F. Hamrock
*Attorney, Agent, or Firm*—Bacon & Thomas

[57] ABSTRACT

A cement and technique for bonding stocks made from EPDM made with ethylidene norbornene or isopropylidene norbornene as the third monomer to conventional general purpose butadiene polymer rubber stocks are disclosed. The cement is made by dissolving compounded polybutadiene having a cis content not over 30%, a trans content of from 35% to 75%, a vinyl content of from 15% to 40%, and a combined trans and vinyl content of at least 70%, and an intrinsic viscosity greater than 2 in a volatile organic solvent. The surfaces of the two stocks to be joined are coated with this cement. The solvent is then caused to evaporate, the two surfaces are pressed together and the plied assembly of the two stocks is then cured under heat and pressure.

5 Claims, No Drawings

BONDING EPDM RUBBER TO GENERAL PURPOSE BUTADIENE POLYMER RUBBER

BACKGROUND OF THE INVENTION

1. Field of the Invention

The field of the invention is the bonding of rubber stocks based on EPDM rubber containing 5-ethylidene-2-norbornene (ENB) or 5-isopropylidene-2-norbornene (IPNB) as the third monomer to general purpose butadiene polymer rubber stocks by the use of a unique bonding cement comprising polybutadiene having a specific microstructure/ or composition in a volatile organic solvent.

EPDM is the designation (1966 Book of ASTM Standards, Part 28, page 678) for sulfur-curable chain saturated copolymers composed of ethylene, propylene and a non-conjugated diene. These new synthetic rubbers are acquiring increasing importance today in the manufacture of a wide variety of useful products.

These new EPDM rubbers are unique in that they possess many of the properties of conventional general purpose elastomers such as emulsion copolymers of butadiene and styrene (SBR), natural rubber (NR), cis-1,4-polybutadiene and synthetic cis-1,4-polyisoprene, while at the same time being much less susceptible to hot air degradation, ozone degradation and weather checking than the conventional general purpose elastomers. This is probably the result of two factors — (a) lower degree of unsaturation in EPDM and (b) location of the unsaturation in short side chains rather than in the main polymer chain. The degree of unsaturation (percent of the carbon to carbon linkages that are double bonds) in EPDM amounts to only a few percent (2-5) as compared to 30-32 in the conventional rubbers. This disparity in degree of unsaturation results generally in differences in rate of vulcanization. Therefore, the cured adhesion of a 100 percent EPDM compound to conventional rubber compounds is generally less than useful.

2. Description of the Prior Art

There are many applications of elastomers in which ozone resistance and resistance to weather checking are needed. Tire sidewalls, tire sidewall cover strips and garden hose covers are examples of such applications. Various procedures have been described already for using EPDM in such applications. British Pat. No. 1,140,190 to Goodyear teaches the use of blends of EPDM with SBR or with mixtures of SBR and NR, stating that if these blends are cured with sulfur and a sulfenamide accelerator, the adhesion to conventional compounds is adequate for blends containing 15% to 35% EPDM. Ozone resistance would be further improved by using more EPDM in the blends, but with this system above 35% EPDM adhesion drops to an unacceptable level. In contrast, the present invention brings about excellent adhesion even though the stock being bonded contains EPDM as the sole rubbery polymer present.

Belgian Pat. No. 698,044 to Copolymer Corporation teaches that vulcanizable EPDM/conventional rubber mixtures can be used as adhesives for bonding slightly unsaturated rubbers to highly unsaturated rubbers.

United States Pat. No. 3,260,641 to Montecatini teaches the use of an elastomeric chlorosulfonated copolymer of ethylene and a higher α-olefin for bonding natural rubber to elastic saturated copolymers of ethylene and higher α-olefins.

United States Pat. No. 3,364,155 to du Pont teaches the use of an adhesive composition for bonding α-olefin hydrocarbon copolymers to elastomeric surfaces. The adhesive composition is comprised of natural rubber, a low molecular weight copolymer of E/P/1,4-hexadiene, and a copolymer of ethylene and hexadiene. E/P/hexadiene tread and sidewall are adhered to SBR/NR carcass.

Despite the teachings of the prior art, typified by the patents just referred to, the achievement of satisfactory bonding of EPDM rubbers in general to general purpose butadiene polymer rubbers continues to present a serious problem in the art.

SUMMARY OF THE INVENTION

The present invention is based on the unexpected discovery that elastomeric ethylene/propylene/ethylidene norbornene or isopropylidene norbornene EPDM rubber compounds can be firmly adhered to conventional general purpose butadiene polymer rubber compounds by first coating the two surfaces to be joined with a cement based on polybutadiene which has an intrinsic viscosity greater than 2 and which contains not over 30% cis, from 35% to 75% trans, from 15% to 40% vinyl, and a combined trans and vinyl content of at least 70% these percentages being by weight, allowing the solvent to evaporate, and then curing the plied assembly of the two compounds under pressure.

It is an object of this invention to provide a means of adhering an ozone resistant EPDM compound selected from the group consisting of EPDMs made with ENB and IPNB to a conventional rubber substrate. A further specific object is to adhere ozone and weather resistant veneers to tire sidewalls.

EPDM is generally a copolymer of ethylene and propylene and a non-conjugated diene. Three types of EPDM are at present commercially available which differ principally in the composition of the diene. The dienes are widely used commercially are 1,4-hexadiene, dicyclopentadiene and 5-ethylidene-2-norbornene (ENB). More recently, 5-isopropylidene-2-norbornene (IPNB) has become commercially available as a third monomer for EPDM rubber and EPDM rubber made with it exhibits the same rapid curing properties and other desirable characteristics are EPDM made with ENB. This invention is concerned only with the ENB and IPNB types. It is believed that the reason for this restriction is that EPDM containing ENB and IPNB can be satisfactorily cured with sulfur and a sulfenamide accelerator whereas the hexadiene and dicyclopentadiene types of EPDM require the use of ultra accelerators such as tetramethylthiuram monosulfide. Such ultra accelerators in the EPDM will migrate into the conventional rubbers and cause over-cure on one side of the interface and under-cure on the EPDM side, if one attempts to adhere such EPDM compounds to conventional rubber compounds. This disparity in state of cure results in little or no cured adhesion.

The preparation of EPDM containing ethylene, propylene and ethylidene norbornene (hereafter written as E/P/ENB) or IPNB is described in U.S. Pat. No. 3,151,173 and Belgian Pat. No. 697,049. Enough of the diene monomer units should be combined to cause the EPDM to have an iodine number of at least 5 and in typical preferred polymers a value of from 7 to 15. Higher amounts are also satisfactory but they become uneconomical to produce. The weight percent of ethylene monomer units may be in the range of 40% to 80%, but in the typical preferred polymers the range is from 55% to 70%.

As will be shown later, many different synthetic rubbers were tested in the form of adhesive cements for bonding E/P/ENB to SBR and other general purpose butadiene polymer rubbers. Only certain polybutadienes were found to be effective. Five different polybutadienes were tested and three of these performed satisfactorily. The following table describes the different polybutadienes which were tested and it is seen that those that are effective have intrinsic viscosity greater than 2 and cis content of not over 30%, a trans content from 35% to 75%, a vinyl content of from 15% to 40%, and a combined trans and vinyl content of at least 70%.

| | % cis | % trans | % vinyl | Intrinsic Viscosity | Bonding Effect |
|---|---|---|---|---|---|
| cis-polybutadiene | 92 | 4 | 4 | 2.4 | none |
| "Diene 45"* | 40 | 52 | 8 | 2.3 | none |
| X-BR** | 25 | 40 | 35 | 2.9 | good |
| Alfin polybutadiene (See Rubber Chemistry and Technology, 38, 103 (1965)) | 10 | 70 | 20 | 3.2 | good |
| Emulsion polybutadiene | 15 | 68 | 17 | 2.7 | good |

*Trademark for a Firestone brand of lithium-catalyzed polybutadiene.
**Made by polymerizing butadiene in a volatile petroleum hydrocarbon solvent at a temperature range of from 150°F. to over 200°F. using butyl lithium as a catalyst and tetrahydrofuran as a Lewis base modifier, the ratio of modifier to active catalyst being 100:1.

As is well-known in the art, variations in the cis, trans and vinyl contents of polybutadiene can be obtained by using different methods and conditions of polymerization. Methods described in the literature include emulsion polymerization, alkali metal-catalyzed polymerization, alfin-catalyzed polymerization and aluminum alkyl-transition metal salt or Ziegler type polymerization.

Emulsion polymerization of 1,3-butadiene gives a polymer with about 60% to 80% trans 1,4-addition, from about 5% to 20% cis 1,4-addition and from about 15% to 20% 1,2-addition (vinyl).

Sodium-catalyzed polybutadiene has from about 60% to 75% 1,2-addition, the remainder being cis and trans 1,4-addition. When potassium and lithium are employed as catalysts, the latter ratios vary to some degree.

With lithium, the ratio of cis:trans:vinyl is about 40:52:8. The proportion of vinyl can be increased with corresponding reduction in cis and trans by the addition of small amounts of tetrahydrofuran during polymerization. Other ethers and certain tertiary amines may also be used in place of tetrahydrofuran. The amount of vinyl or 1,2-addition will be determined by the type and concentration of ether or amine as well as by the temperature and solvent. (H. L. Hsieh, J. Polymer Science, 3A, 153ff (1965)).

Ziegler polymerization or the use of catalysts consisting of aluminum alkyls and transition metal salts as, for example, triethyl aluminum and titanium tetraiodide, result in polybutadienes with 90% or higher cis 1,4-addition, the remainder being about evenly divided between trans 1,4-addition and 1,2-addition.

Another way to vary the cis and trans contents is to isomerize the cis structural units to the trans configuration. The vinyl content remains constant. This can be accomplished under conditions described by M. A. Golub, J. Polymer Science 25, 373 (1957). The method consists of exposing a dilute benzene solution of cis-polybutadiene, containing a small amount of a sensitizer, to ultraviolet light for a few hours. Examples of effective sensitizers include allyl bromide, bromobenzene, carbon tetrabromide, phenyl sulfide, allyl sulfide and diphenyl disulfide and many other organic bromides, sulfides, disulfides and mercaptans.

The relative amounts of cis 1,4-addition, trans 1,4-addition and 1,2-addition of polybutadiene can be determined by infrared spectroscopy using, for example, the procedure developed by Silas, Yates and Thornton (Analytical Chemistry 31, 529 (1959)).

In order to obtain a satisfactory level of cured adhesion between the ozone resistant EPDM compound and the general purpose butadiene rubber compound by use of the bonding cement of this invention, the following limitations must be observed. (1) The EPDM compound must contain ENB or IPNB as the termonomer for curing. Blends of these types of EPDM with other types of EPDM could be used. (2) The general purpose butadiene rubber compound may be an emulsion copolymer of butadiene and styrene, an alfin copolymer of butadiene and styrene, emulsion polybutadiene, and blends of these with one another or with cis-polybutadiene, but the amount of cis-polybutadiene must be limited to 25% or less.

The negative effect of cis-polybutadiene in high concentrations in the butadiene rubber stock is completely unexpected and is not understood. One is tempted to speculate that in polybutadienes having low cis contents, the rate of vulcanization and/or the mechanism matches that of E/P/ENB or E/P/IPNB rubber whereas in the case of cis-polybutadiene and E/P/ENB or E/P/IPNB there is a mismatch. However, the invention should not be limited by this hypothesis.

An important feature of the rubber and cement compositions of the invention is the use of vulcanization accelerators that are approximately equally effective for E/P/ENB or E/P/IPNB rubber and general purpose butadiene rubbers. The preferred accelerators include N-cyclohexyl-2-benzothiazole sulfenamide, 2-(morpholinodithio)-benzothiazole, and N,N-di-tert butyl-benzothiazole-2-sulfenamide.

In practicing the invention, we simply apply a thin layer of the bonding cement in any suitable way on the surfaces of the unvulcanized rubber compounds to be joined, allow a considerable portion of the solvent to evaporate from the coated surfaces, bring the two surfaces together with suitable pressure, and then, while maintaining this pressure, subject the assembly to vulcanization in the known manner.

The bonding cement consists of a solution of compounded polybutadiene stock in any suitable volatile organic solvent. Compounding and vulcanizing ingredients are so chosen and are used in such amounts as to effect vulcanization of the polybutadiene content of the cement to a vulcanizate having good properties; the selection of these ingredients and the determination of the amounts used are in accordance with principles well known to those skilled in the art of compounding and vulcanizing polybutadiene and EPDM rubbers. Usually the cement stock thus prepared contains conventional loadings of fillers or pigments such as reinforcing carbon black, white fillers or pigments such as silica, calcium silicate or lignin, or colored fillers or pigments. The cement stock may also contain extender oil of the same type and amount that is present in the stocks that are being bonded.

In preparing the cement the compounded polybutadiene stock and tackifier resin, if one is used, are dispersed in a suitable volatile organic solvent in the obvious manner whereby the polybutadiene stock, tackifier and other materials in the polybutadiene stock are dissolved or dispersed in the solvent according to their solubilities. Our novel cement is usually so formulated as to contain from 3 to 20 parts by weight of total solids per 100 parts of the cement. The preferred range is 6 to 10. The volatile organic solvent used as the vehicle in the cement can be any liquid having the requisite power of dissolving the polybutadiene compound and having appropriate volatility. Examples are cyclohexane, gasoline, trichloroethylene, n-hexane, etc.

For the purpose of determining in the laboratory which compositions will have good cured adhesion as distinguished from those which fail, we have made adhesion test slabs which can be tested either on the Instron machine or by the dynamic adhesion test using the apparatus described by F. H. D. Akkerman in the Journal of Applied Polymer Science, Vol. 7, page 1425 (1963) without the photographic equipment. To prepare the sample, two slabs of the vulcanizable rubber stocks to be adhered together, measuring about 4 × 4 inches in area and from 0.1 to 0.2 inch in thickness, are cut from calendered sheets and one is superposed on the other, a very thin sheet of plastic film such as Mylar polyester, being inserted between them over about one-half of their area. The directly contacting faces of the rubber pieces are first coated with the bonding cement. Pieces of nylon or rayon fabric are then laid against the top and bottom outer faces of the slabs. The composite is placed in a platen mold and vulcanized under heat and pressure. The vulcanized composite is then cut into strips 1 × 4 inches in such direction that half of each strip contains the plastic release sheet. The ends of the strip can then be pulled apart so that the sample has two legs joined to a unitary body of rubber, half the length of the sample, in which the two rubber stocks have become integrally united. The legs of the sample are clamped into the two sample-holding jaws of the machine at a constant predetermined distance from the line of partition between the two legs of the sample. The clamped sample is then preheated 15 minutes at the temperature of the test. The sample holder is then mounted in the oven of the machine maintained at the desired temperature, balanced inertia weights are applied, and the cam-operated oscillation is started, as described by Akkerman. A dial-type thickness gauge is mounted on the machine in such a manner as to permit a direct measurement of changes in the distance between the upper and lower sample jaws. The change in position of the lower jaw affords a measure of the resistance of the adhering rubber stocks to a separating pull. The test is run for 15 minutes at an oven temperature of 120°C., or until the sample completely separates and the time and extent of separation are recorded. The data are here reported as reciprocals of the rate of separation or specifically, the time in minutes to achieve an inch of separation calculated from the rate derived from the test. This method of treating the data has the advantage of showing the results as whole numbers increasing in magnitude as the degree of adhesion increases. For example, if a sample separated 0.25 inches in 15 minutes, the result would appear as 60 minutes-/inch as reported here. Values equal to or greater than 30 minutes/inch indicate a level of adhesion which would be satisfactory for many rubber products including tires.

EXAMPLES

The following examples illustrate the practice of the invention.

Preparation of Compounds, Cements and Adhesion Test Slabs

The rubber compounds used in the experiments reported in these examples were made according to the following recipe:

Compound Formulation

| | Parts by Weight |
| --- | --- |
| Polymer | 100 |
| Aromatic extender oil, ASTM Type 102 | 40 |
| Carbon Black, ASTM N-285 | 70 |
| N-isopropyl-N'-phenyl-p-phenylene diamine | 1 |
| Stearic acid | 1 |
| Zinc oxide | 5 |
| N-cyclohexyl-2-benzothiazole sulfenamide | 1 |
| Diphenyl guanidine | 0.3 |
| Sulfur | 2 |

The same recipe was used for preparation of E/P-/ENB rubber compounds used in adhesion test pads, the compounds used in making the cements and in the general purpose butadiene rubber compounds used in adhesion test pads.

The rubber compounds were prepared in the customary manner using a Banbury mixer to combine all of the ingredients except the last three which were added on a two-roll rubber mill. The Banbury was heated with steam to attain a stock temperature of 150°C. at the time it was dumped, usually after about 10 minutes at 55 rpm in the laboratory B Banbury. The sulfur and accelerators were then added on a two-roll rubber mill at 125°–150°F.

A test slab, 6 × 6 × 0.100 in. was vulcanized for 30 minutes at 160°C. and tested at 25°C. for its stress-strain properties. A load at 300% extension in the range of 700 to 1,500 pounds per square inch was accepted as evidence that no serious error had been made in compounding and also as evidence that a satisfactory state of cure would be attained in the adhesion test slabs. This cure specification is met by EPDM rubbers which contain ENB or IPNB as the termonomer but not by EPDM containing only 1,4-hexadiene or dicyclopentadiene as the termonomer for unsaturation. The last two common types of EPDM are not sufficiently responsive to sulfenamide acceleration.

Sheets of the uncured compound having a thickness of 0.175 inch were prepared by passing the compound through a roll calender. These sheets were used in the construction of test slabs to determine the effectiveness of the various bonding cements.

Cements were made by dispersing the raw compound, made according to the above recipe with polybutadiene having a cis content not over 30%, a trans content of at least 35% and not over 75%, a vinyl content of at least 15% and not over 40%, a combined trans and vinyl content of at least 70%, and an intrinsic viscosity greater than 2, in cyclohexane. The proportions used were 6 grams of compound and 100 ml. cyclohexane. The procedure used in making cement was to take freshly milled stock, cut it into small pieces which were placed in the solvent and shaken vigorously overnight. Then the mixture was homogenized by use of a high speed Eppenbach Homomixer (trademark).

The bonding cements were painted on the two slabs of vulcanizable rubber stocks, one containing E/P/ENB and the other containing a general purpose butadiene rubber such as SBR. After waiting 30 minutes for most of the solvent to evaporate, the two pieces were put together and vulcanized, as described above, for 30 minutes at 320°F. The quality of adhesion was generally determined by use of the dynamic test described above, but in a few instances the force required to separate the two stocks was determined by pulling them apart in an Instron machine at a rate of 2 inches per minute and with the sample contained in an oven with an air temperature of 250°F.

Twenty-nine examples are shown. Examples 5 to 7, 14 to 20, 22, 25 and 26 are included within the invention. Examples 1 to 4, 8 to 13, 21, 23, 24 and 27 to 29 are outside the invention.

Four different ENB-type EPDM elastomers, all composed of ethylene, propylene and ethylidene norbornene, were used in the following experiments. Characteristics of these materials are tabulated below:

| ENB-Type EPDM | Wt. % Ethylene | Iodine No. | ML-4 212°F. |
|---|---|---|---|
| A | 62 | 7 | 91 |
| B | 52 | 7 | 98 |
| C | 49 | 10 | 90 |
| D | 60 | 9 | 98 |

In Examples 1 to 13 inclusive, a series of adhesion pads were made to test the bonding qualities of cements made from a wide range of elastomeric compositions. In each case EPDM-A was used in one layer of the adhesion pad and "Synpol 1712" (trademark) brand of SBR in the other.

(Synpol 1712 is a synthetic rubber of butadiene and styrene made by Texas-U.S. Chemical Company containing 23 ± 1% styrene, 37.5 phr aromatic extender oil, and having a Mooney viscosity at 100°C. of 43–55.)

Examples 1 to 13 show that of 12 cements containing 12 different polymers, only three (Examples 5, 6 and 7) were effective in adhering the EPDM-A stock to general purpose butadiene/styrene rubber stock.

In Examples 14, 15 and 16, the cement of Example 6 was used in adhesion pads containing Synpol 1712 stock on one side and each of the other three EPDM stocks on the other. A high degree of bonding was obtained in all.

| Example | ENB-Type EPDM | 250°F. Dynamic Adhesion |
|---|---|---|
| 14 | B | 81 |
| 15 | C | 63 |
| 16 | D | 67 |

In Examples 17, 18 and 19 the cement of Example 7 was tested with pairs of stocks like those used in Examples 14, 15 and 16 and a high degree of bonding was obtained in all.

| Example | ENB-Type EPDM | 250°F. Dynamic Adhesion |
|---|---|---|
| 17 | B | 60 |
| 18 | C | 69 |
| 19 | D | 28 |

In Examples 20 and 21 the cement of Example 5 was used to bond EPDM-A to polybutadiene stocks in which the microstructure varied. Emulsion polybutadiene was used in Example 20 and "Diene 45" polybutadiene was used in Example 21.

The results show that the effectiveness of bonding decreases as the cis content of the general purpose stocks increases, and the bonding to 40% cis content stock is nil.

| Example | Polybutadiene Microstructure | | | Dynamic Adhesion |
|---|---|---|---|---|
| | cis | trans | vinyl | |
| 20 | 15 | 68 | 17 | 37 |
| 21 | 40 | 52 | 8 | 2 |

| Example | Polymer Used in Cement | | | | | Adhesion at 250°F. Dynamic min./inch | Instron lbs./inch |
|---|---|---|---|---|---|---|---|
| 1 | None (Cyclohexane was used by itself.) | | | | | 0 | 7 |
| 2 | Synpol 1712 | | | | | 7 | 5 |
| | | cis | trans | vinyl | I.V. | | |
| 3 | Polybutadiene | 92 | 4 | 4 | 2.4 | 0 | <10 |
| 4 | Polybutadiene | 40 | 52 | 8 | 2.3 | 1 | |
| 5 | Polybutadiene | 25 | 40 | 35 | 2.9 | 99 | |
| 6 | Polybutadiene | 15 | 68 | 17 | 2.7 | 96 | 34 |
| 7 | Polybutadiene | 10 | 70 | 20 | 3.2 | 70 | 50 |
| 8 | Solution SBR*** | | | | | 0 | |
| 9 | Butadiene-5-methyl-2-vinyl pyridine copolymer, 75/25 | | | | | 0 | |
| 10 | Isoprene/butadiene copolymer | | | | | 0 | |
| 11 | Chlorosulfonated polyethylene* | | | | | 0 | |
| 12 | 50% EPDM-A/50% Synpol 1712 | | | | | 1 | |
| 13 | Synpol 8401** | | | | | 0 | |

*du Pont Hypalon 20, 29 ± 2% Cl, 1.4 ± 0.15% S Mooney viscosity 30 ± 6.
**Texas-U.S. Chemical Co. butadiene copolymer with 38–41 wt. % combined styrene, 37.5 highly aromatic extender oil and Mooney viscosity at 100°C. of 50–60.
***Philips Petroleum Co. Solprene 300, butadiene copolymer with 23 wt. % combined styrene, intrinsic viscosity 1.7 in toluene at 30°C., Mooney viscosity at 100°C of 44.

In Examples 22, 23 and 24 the cement of Example 7 was used to bond EPDM-A to polybutadiene stocks having different microstructures. Good bonding was obtained only in the cases where the cis content was low. No bonding was obtained with polybutadienes containing 40% and 92% cis.

| Example | Polybutadiene Composition | | | Dynamic Adhesion |
|---|---|---|---|---|
| | cis | trans | vinyl | |
| 22 | 15 | 68 | 17 | 100 + |
| 23 | 40 | 52 | 8 | 6 |
| 24 | 92 | 4 | 4 | 0 |

In Examples 25 to 28 inclusive, the cement of Example 6 was used to bond EPDM-A to polybutadiene stocks having different microstructures. Example 29 is like 28 except EPDM-C was used in place of EPDM-A. As in the previous examples, good bonding was achieved only to stocks that were low in cis content. Those containing 40% and 92% cis failed completely to adhere.

| Example | Polybutadiene Composition | | | Dynamic Adhesion |
|---|---|---|---|---|
| | cis | trans | vinyl | |
| 25 | 15 | 68 | 17 | 87 |
| 26 | 25 | 40 | 35 | 61 |
| 27 | 40 | 52 | 8 | 1 |
| 28 | 92 | 4 | 4 | 0 |
| 29 | 92 | 4 | 4 | 0 |

While the foregoing examples show the bonding of ENB-types of EPDM only, IPNB-types of EPDM can be substituted therefor with the same results as are shown in the examples.

The cements of the invention do not give useful results when one attempts to use them to bond the ENB- and IPNB-types of EPDM to rubber stocks in which the rubber polymer consists of polyisoprene such as natural rubber or synthetic polyisoprene.

From the foregoing it will be seen that the present invention provides a simple, practical and highly effective method of bonding ENB- and IPNB-types of EPDM to general purpose butadiene polymer rubbers. The invention can be used to make any type of composite rubber article comprising an ENB- or IPNB-type of EPDM laminated to a general purpose butadiene polymer rubber, examples of such articles being tires, belts, etc. The invention is particularly advantageously employed for bonding a white or colored ENB- or IPNB-EPDM stock to a general purpose butadiene polymer stock; thus it is especially suitable for providing a white or colored sidewall cover strip on a pneumatic tire.

Having thus described our invention what we claim and desire to protect by Letters Patent is:

1. A bonding cement consisting essentially of a solution of compounded polybutadiene in a volatile organic solvent, said polybutadiene having a cis content of 10% to 25%, a trans content of from 40% to 70%, a vinyl content of from 17% to 35%, and a combined trans and vinyl content at least equal to 70%, said percentages being by weight, and an intrinsic viscosity greater than 2, said cement comprising compounding and vulcanizing ingredients capable of effecting vulcanization of said polybutadiene.

2. A cement as set forth in claim 1 in which the total solids content ranges from 3 to 20 parts by weight per 100 parts of the cement.

3. A cement as set forth in claim 1 wherein said vulcanizing ingredients include vulcanization accelerator which is approximately equally effective for EPDM rubber in which the third monomer is 5-ethylidene-2-norbornene, EPDM rubber in which the third monomer is 5-isopropylidene-2-norbornene, and general purpose butadiene rubbers.

4. A cement as set forth in claim 3 wherein said accelerator is a sulfenamide.

5. A cement as set forth in claim 4 wherein said accelerator is N-cyclohexyl-2-benzothiazole sulfenamide.

* * * * *